UNITED STATES PATENT OFFICE 2,498,619

POLYGLYCOLSULFONIC ACID SALTS OF DIAMINODIPHENYL SULFONE AND PREPARATION THEREOF

Earl W. Gluesenkamp, Centerville, and Milton Kosmin, Dayton, Ohio, assignors to Monsanto Chemical Company, St. Louis, Mo., a corporation of Delaware No Drawing. Application November 24, 1948, Serial No. 61,896

4 Claims. (Cl. 260—397.6)

This invention relates to a new family of therapeutic agents having unusual activity in inhibiting the growth of tuberculosis bacteria. More specifically the invention relates to methods of rendering 4,4'-diaminodiphenyl sulfone water soluble, without seriously reducing the effectiveness of the therapeutic agent.

It is known that 4,4'-diaminodiphenyl sulfone is an active agent for controlling tuberculosis bacteria in culture media. Because of its insolubility in water it is not effective when used in contact with living animal tissue. It is also known that 4,4'-diaminodiphenyl sulfone can be converted into water soluble derivatives by substituting hydrophilic radicals on the amino groups, and that some of these derivatives retain part of their therapeutic activity. One such derivative, which is known as "Promin" and is commercially available for the purpose of inhibiting the growth of tuberculosis bacteria, has the structure:

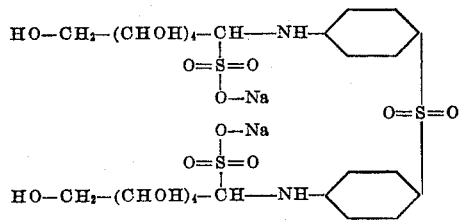

Although this prior art compound is widely used because of its solubility, it is much less active than the diaminodiphenyl sulfone, as shown by tests in bacteria cultures.

The primary purpose of this invention is to provide new water soluble derivatives of diaminodiphenyl sulfone which have better bacteristatic activity than commercially available derivatives. A further purpose of the invention is to provide a method of converting 4,4'-diaminodiphenyl sulfone into water soluble derivatives without seriously impairing its therapeutic activity. A still further purpose is to provide new medicinal compounds.

It has been found that 4,4'-diaminodiphenyl sulfone can be made water soluble by reacting one or both of its amino groups with polyethylene glycol sulfonic acid. The modified sulfones so produced do not have an appreciably diminished thereapeutic effect and have been found to be approximately one hundred times as effective as the "Promin" of the prior art.

The new class of compounds will have the following structural formula:

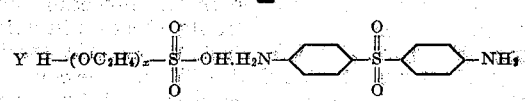

wherein $x$ is a whole number from five (5) to thirty (30), inclusive, and $Y$ is a whole number from one (1) to two (2), inclusive.

The new compounds may be prepared by the reaction of N,N'-diaminodiphenyl sulfone with one or two molecular equivalents of the polyethylene glycol sulfonic acid, which is readily synthesized by reacting an aqueous solution of a bisulfite salt with ethylene oxide and thereafter acidifying the resulting compound. In the preferred practice of this invention sodium bisulfite is reacted with from 5 to 30 moles of ethylene oxide and the resulting sulfonic acid salt is acidified with a strong mineral acid, for example sulfuric acid. If desired the polyethylene glycol sulfonic salt may be concentrated by evaporation at moderate temperatures and reduced pressure prior to treatment with the mineral acid. The sulfonic acid is readily separated from the sodium sulfate by conducting the acidification in an aqueous alcohol solution, preferably ethyl alcohol at concentrations in excess of 80 percent ethanol. The sulfonic acid salts are prepared by adding the 4,4'-diaminodiphenyl sulfone to the alcohol solution of the polyethylene glycol sulfonic acid in the proportions required for the formation of the desired salt. The product may be isolated by evaporation to dryness and dried in a vacuum oven.

The new compounds are water soluble and therefore more effective in the treatment of bacteria in the presence of animal tissues than known derivatives of 4,4'-diaminodiphenyl sulfone.

Further details of the preparation and use of this invention are set forth with respect to the following specific examples.

Example 1

A thirty-eight percent solution of sodium bisulfite was prepared by dissolving 51.8 parts of solid sodium bisulfite in 144.5 parts of water. The solution was confined in a closed vessel and ethylene oxide bubbled through it until 292.2 parts by weight of ethylene oxide had been absorbed. This corresponded to a ratio of 13.33 moles of ethylene oxide per mole of sodium bisulfite. The solution so obtained was found to be 70.5 percent of the sodium bisulfonate of ethylene glycol. The solution was warmed and maintained at 15 to 20 mm. absolute pressure by means of a water aspirator under which conditions 24.8 percent of the weight was lost by evaporation of water. The resulting concentrated solution was mixed with an equal volume of absolute alcohol and then treated with 0.5 normal sulfuric acid in amount equivalent to the sodium salt present. The reaction mass was then filtered to remove the sodium sulfate which precipitated, and 124 parts by weight of 4,4'-diaminodiphenyl sulfone was added thereto. The resulting salt solution was evaporated to dryness over a water bath and ultimately dried to constant weight in a vacuum oven at 70° C. The product was comprised essentially of the compound with the structural formula:

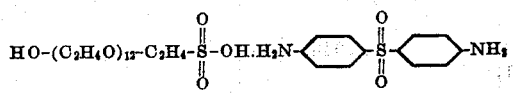

*Example 2*

The compound prepared in the preceding example was tested to measure its effect on inhibiting the growth of the virulent bacteria strain *Mycobacterium tuberculosis* H37Rv. The concentration of the agents required to inhibit the growth of the bacteria in a standard culture was measured in miligram percent. The "Promin" of the prior art was used as a control. It was found that 65 milligram percent of Promin had substantially the same effect of 0.6 milligram percent of the compound prepared in the preceding example.

The invention is defined by the following claims.

We claim:

1. A compound having the structural formula:

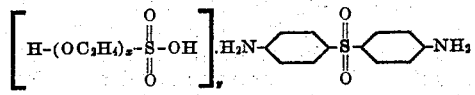

wherein $x$ is a small whole number from five (5) to thirty (30), inclusive, and $y$ is a small whole number from one (1) to two (2), inclusive.

2. A compound having the structural formula:

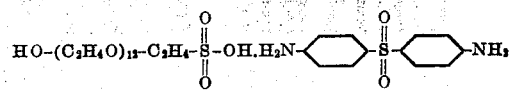

3. A method of preparing a derivative of 4,4'-diaminodiphenyl sulfone which comprises reacting 4,4'-diaminodiphenyl sulfone with from one to two moles of the compound having the structural formula:

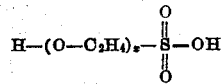

wherein $x$ is a whole number from five (5) to thirty (30).

4. A method of preparing a derivative of 4,4'-diaminodiphenyl sulfone which comprises reacting equimolar proportions of 4,4'-diaminodiphenyl sulfone and the compound having the structural formula:

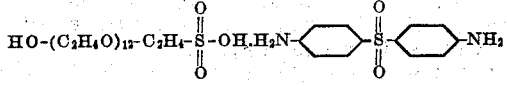

EARL W. GLUESENKAMP.
MILTON KOSMIN.

No references cited.